(12) United States Patent
Hansson et al.

(10) Patent No.: US 6,334,185 B1
(45) Date of Patent: Dec. 25, 2001

(54) METHOD AND APPARATUS FOR CENTRALIZED ENCRYPTION KEY CALCULATION

(75) Inventors: Rolf Elis Gustaf Hansson, Kungsängen; Hans-Olof Sundell, Öckerö, both of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/148,952

(22) Filed: Sep. 8, 1998

(51) Int. Cl.[7] .................................................. G06F 1/32
(52) U.S. Cl. ..................... 713/151; 380/247; 380/259; 380/278
(58) Field of Search .................................. 380/247, 259, 380/278, 279; 713/151

(56) References Cited

U.S. PATENT DOCUMENTS

| | | | |
|---|---|---|---|
| 4,182,933 | * | 1/1980 | Rosenblum .......................... 380/279 |
| 5,642,401 | | 6/1997 | Yahagi ..................................... 379/58 |
| 6,047,194 | * | 4/2000 | Andersson ............................. 455/466 |

FOREIGN PATENT DOCUMENTS

WO 97/12461    4/1997  (WO).

OTHER PUBLICATIONS

Menezes et al., Handbook of Applied Cryptography, 1997, CRC Press, pp. 544–547.*
Standard Search Report for RS 101804 US Completed on May 7, 1999.

* cited by examiner

Primary Examiner—Thomas R. Peeso
(74) Attorney, Agent, or Firm—Jenkens & Gilchrist, P.C.

(57) ABSTRACT

A system and method for encrypting transmissions between a plurality of communication nodes and a mobile station, wherein the algorithm for generating an encryption key resides within a first communications node. A second communications node requiring encryption between the node and a mobile station requests an encryption key from the first communications node through a PMAP interface interconnecting the nodes. The first node generates the encryption key and a countersign and transmits them back to the second communications node. The transmitted countersign is compared with a countersign provided by the mobile station, and if they match, transmissions from the second communications node to the mobile station are encrypted using the provided key.

11 Claims, 2 Drawing Sheets

METHOD AND APPARATUS FOR CENTRALIZED ENCRYPTION KEY CALCULATION

BACKGROUND OF THE INVENTION

1. Technical Field of the Invention

The present invention relates generally to the encryption of communications between a mobile station and a network, and more particularly, to a method and apparatus for encryption between a mobile switching center node and a packet mobile switching center node utilizing an encryption algorithm stored only on a single node.

2. Description of Related Art

In a mobile cellular communications system the information which is transmitted between the network and a mobile station (MS) must be protected from undesired interception. This is accomplished by encrypting transmissions sent over the air interface between the mobile station and the network. This is normally accomplished by using some type of encryption algorithm which is executed between the network and the mobile station. Voice communication encryptions are handled by a mobile switching center (MSC) node.

The continued development of wireless communications have added the ability for a mobile station to utilize both voice communications and packet-switched communications. Packet-switched communications are handled between a mobile station and a packet mobile switching center (PMSC) packet-switching node. By introducing packet-switched communications services within a communications system, the mobile station is connected to the PMSC through the air interface when transmitting packet data.

Since the algorithm for calculating the encryption key is secret and complex, it is not a preferred solution to implement the same algorithm on the PMSC node along with the algorithm on the MSC node. Furthermore, by implementing the algorithm on two separate nodes, synchronization problems may occur during hardware/software upgrades of the nodes. Thus, some method for enabling encryption between the mobile station and both MSC and PMSC nodes is desired.

SUMMARY OF THE INVENTION

The present invention overcomes the foregoing and other problems with a system and method for encrypting transmissions between mobile switching center and packet mobile switching center nodes and a mobile station. An encryption algorithm for generating an encryption key reside within the mobile switching center node. In response to a packet data communications request between the packet mobile switching node and the mobile station, a random number is generated by the PMSC. The random number is transmitted from the packet mobile switching center to the mobile switching center over an interface interconnecting the two nodes using a PMAP protocol. Utilizing the provided random number, the mobile switching center calculates the encryption key and the countersign from the random number and transmits the key and the countersign back to the packet mobile switching center over the same PMAP protocol interface.

At the same time, the packet mobile switching center transmits a request for the countersign to the requesting mobile station. The mobile station calculates the encryption key and the countersign utilizing the provided random number generated at the packet mobile switching center and transmits the countersign back to the packet mobile switching center node. The packet mobile switching center node compares the countersigns received from the mobile switching center and the mobile station to confirm that they match. If the provided countersigns match, transmissions between the packet mobile switching center and the mobile station are encrypted utilizing the calculated encryption key.

BRIEF DESCRIPTION OF THE DRAWINGS

For a more complete understanding of the present invention, reference is made to the following Detailed Description taken in conjunction with the accompanying drawings wherein.

DETAILED DESCRIPTION OF THE INVENTION

Figure 1:
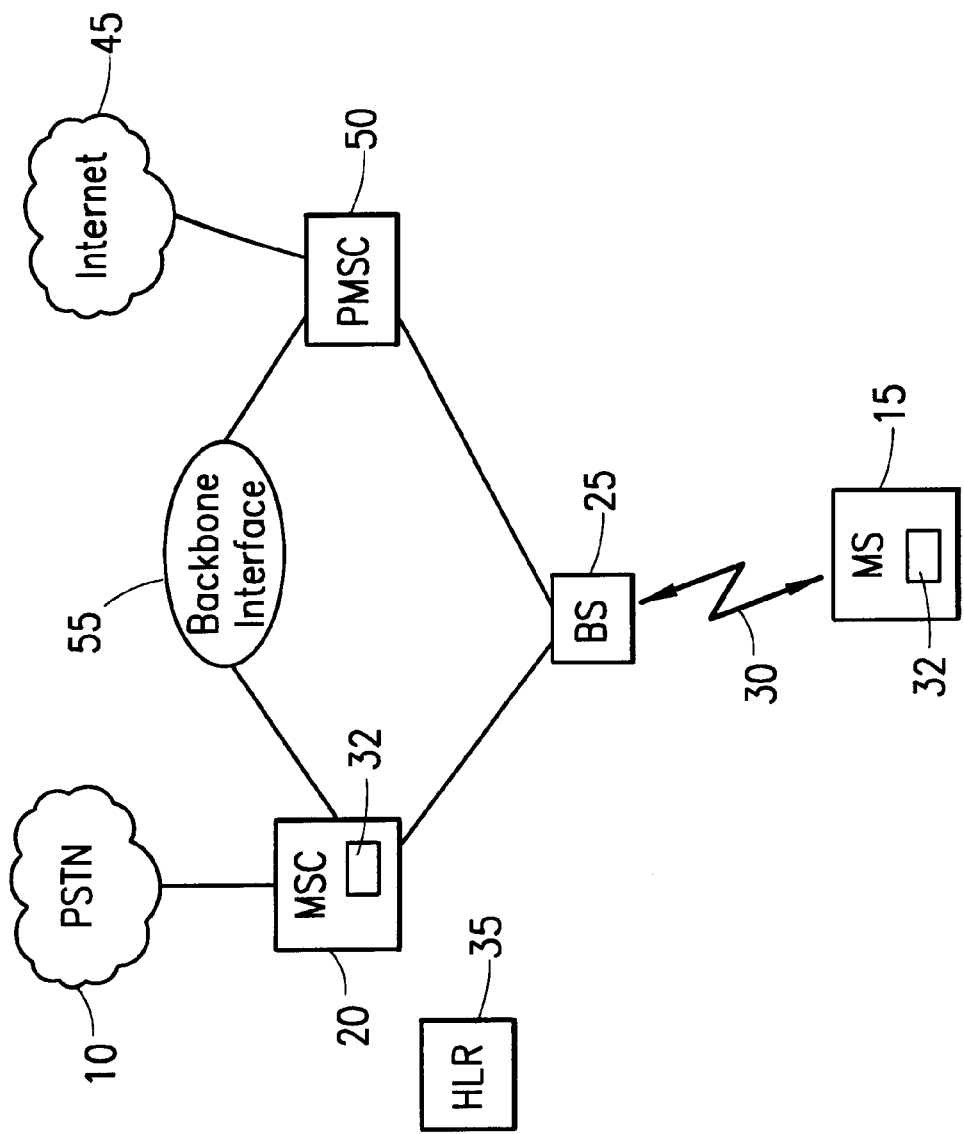
FIG. 1 is a block diagram of the system architecture of the present invention.

Referring now to the Drawings, and more particularly to FIG. 1, there is illustrated a schematic illustration of the system architecture of the present invention. For communications between a PSTN network 10 and a mobile station 15, a communications link must be formed between the PSTN network 10 and the mobile station 15 through the mobile switching center (MSC) 20 and base station 25 associated with the mobile station 15. For communications over the air interface 30 between the mobile switching center 20 and mobile station 15 via base station 25 an encryption algorithm must be utilized.

The communications system utilizes an encryption algorithm 32 which is executed within the mobile switching center 20 and the mobile station 15. The encryption algorithm 32 requires subscriber information unique to the subscriber which is stored within the home location register 35 of the mobile station 15 and within the mobile station. The subscriber information is obtained using the MSC 20, and the information is transmitted to the mobile station 15 during the authentication phase of a call establishment procedure. After a valid authentication between the network and the mobile station, voice data is encrypted using an encryption key calculated by the algorithm at both the MSC 20 and mobile station 15 using the subscriber information and a generated random pattern.

Packet-switched communications between a data network, such as the Internet 45, and the mobile station 15, take place through a packet mobile switching center (PMSC) 50. The PMSC 50 enables packet data transmissions to occur between a data network, such as Internet 45, and the mobile station 15. When transmissions from the Internet 45 are transmitted between the base station 25 and the mobile station 15 over the air interface 30, the data again must be encrypted to avoid undesired interception by third-parties. However, since communications are taking place with through the PMSC 50 rather than the MSC 20, there is no way to encrypt the data being transmitted without adding the encryption algorithm 32 to the PMSC node.

In order to avoid implementing the encryption algorithm 32 within the PMSC node 50, the MSC 20 and PMSC 50 are interconnected via a backbone interface 55. The backbone interface 55 enables the MSC 20 and PMSC 50 to communicate using a PMAP protocol. In this manner, the encryption algorithm 32 may only be included on the MSC node 20 while still enabling the PMSC node 50 to implement the encryption techniques during packet data transfers by accessing the encryption algorithm over the backbone interface 55.

Figure 2:
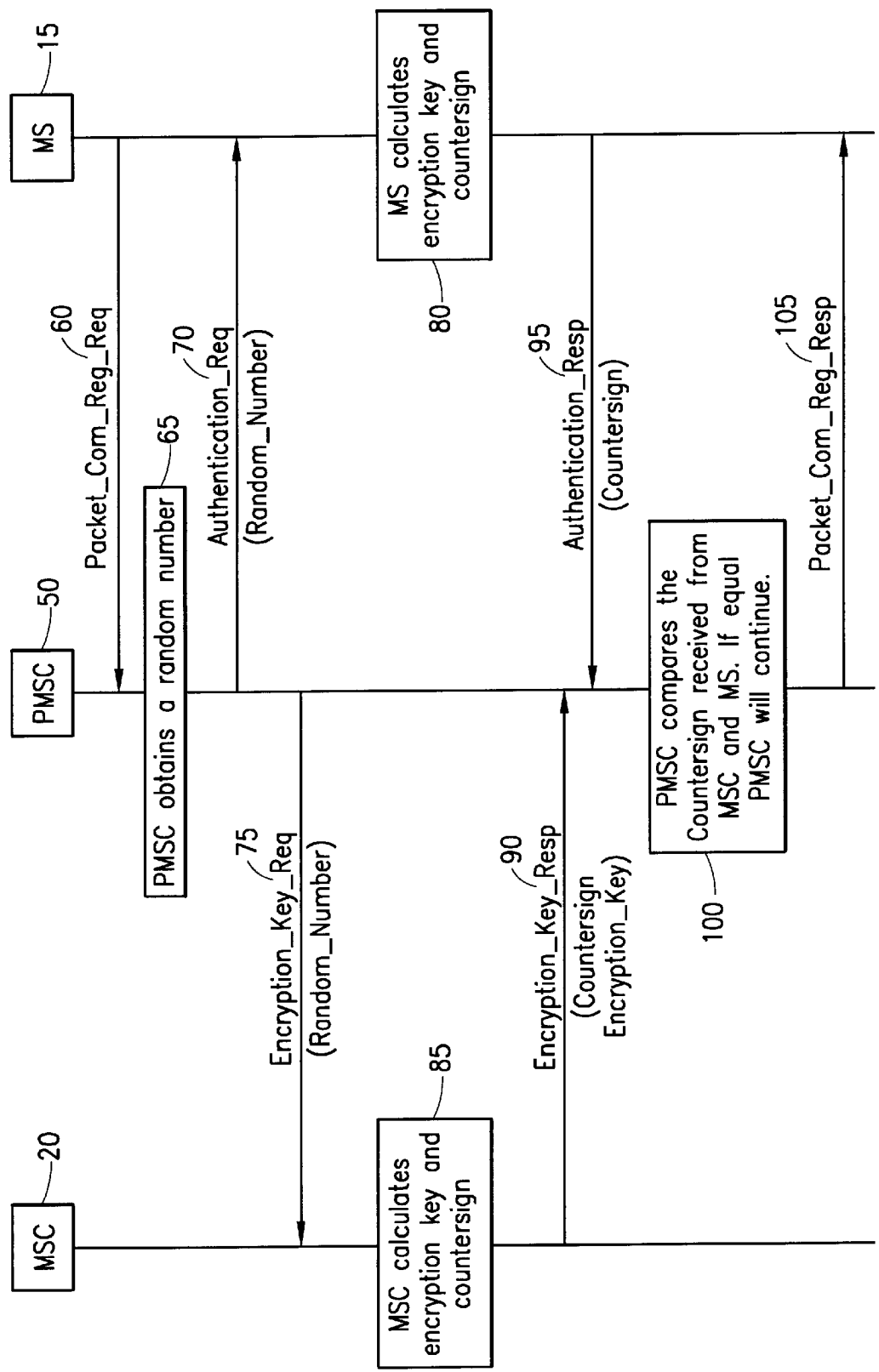
FIG. 2 is a signaling diagram of the present invention.

Referring now to FIG. 2, there is illustrated a signaling diagram describing the manner in which encryption of packet data transmissions may be accomplished between the PMSC 50, MSC 20 and mobile station 15. Initially, the mobile station 15 makes a packet communications registration request 60 to the PMSC 50 requesting the creation of a packet communications connection from the mobile station 15 to the PMSC 50 and onward to the Internet (data network) 45. In response to the packet communications registration request 60, the PMSC 50 obtains a random number at 65 required for the generation of the encryption key. The random number is forwarded to the mobile station 15 via an authentication requests 70 and to the MSC 20 via an encryption key request 75.

In response to the provided random number, the mobile switching center 20 calculates an encryption key and countersign at 85 using the encryption algorithm 32 stored at the MSC. Likewise, the mobile station 15 utilizes the provided random number to calculate at 80 the encryption key and countersign. After these calculations, the encryption key response 90 provides the countersign and encryption key back to the PMSC 50 from the mobile switching center 20, and the authentication response 95 provides the countersign back from the mobile station 15. The PMSC 50 compares at 100 the countersigns received from the MSC 20 and the mobile station 15. If they are equal, the PMSC 50 provides a packet communications registration response 105 back to the MSC 15.

It should be noted that each of the communications, namely the encryption key requests 75 and encryption key response 90 between the PMSC 50 and MSC 20, are transmitted over the backbone interface 55 using the PMAP protocol. Using this method, the encryption algorithm need only reside at the MSC 20 and not within the PMSC 50. In this manner, the encryption algorithm may be limited to a single node within the network minimizing complexities of the system.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A system for providing encryption of transmissions over an air interface between a mobile station and a plurality of nodes, comprising:

a voice network switching node for communicating with the mobile station and a voice network, said voice network switching node including an algorithm for calculating an encryption key for encrypting transmissions between the plurality of nodes and the mobile station and a countersign in response to a random number;

a packet data network switching node for communicating with the mobile station and a packet data network, said packet data network switching node requesting the encryption key for encrypting transmissions to the mobile station and a contersign from the voice network switching node and requesting the countersign from the mobile station, said request including the random number, said packet data network switching node further comparing the countersign from the voice network switching node and the countersign from the mobile station and providing encrypted communications between the mobile station and the packet data network switching node using the encryption key; and a backbone interface for interconnecting the voice network switching node and the packet data network switching node.

2. The system of claim 1, wherein the voice network switching node comprises a mobile switching center.

3. The system of claim 2, wherein the packet data network switching node comprises a packet mobile switching center.

4. The system of claim 1, wherein the backbone interface provides for communications between the voice network switching node and the packet data network switching node using a PMAP protocol.

5. A method for encrypting transmissions between a voice network node, a packet data network node and a mobile station, wherein the algorithm for generating an encryption key resides within only the voice network node, comprising the steps of:

requesting, at the packet data network node, an encryption key from the voice network node and a countersign from the voice network node and the mobile station;

generating the encryption key and a countersign at the voice network node responsive to the request;

transmitting the generated encryption key and countersign to the packet data network node from the voice data network node;

generating the countersign at the mobile station responsive to the request;

transmitting the generated countersign to the packet data network node from the mobile station;

comparing at the packet data network node the countersign received from the voice network node with the countersign provided by the mobile station; and encrypting transmission between the packet data network node and the mobile station using the encryption key if the countersigns match.

6. The method of claim 5, wherein the step of requesting further comprises the step of:

transmitting a request to the voice network node using a PMAP protocol.

7. The method of claim 6, wherein the step of transmitting further comprises the step of:

transmitting the generated encryption key and the countersign to the packet data network node from the voice network node using the PMAP protocol.

8. The method of claim 5, wherein the step of requesting further comprises the steps of:

obtaining a random number; and transmitting an encryption key request to the voice network node, the encryption key request including the random number.

9. The method of claim 5 further including the step of:

requesting packet data communications between the PMSC node and the mobile station.

10. The method of claim 5 further comprising the steps of:

requesting the countersign from the mobile station;

calculating the countersign at the mobile station; and transmitting the calculated countersign to the PMSC node.

11. A method for encrypting transmissions between MSC and PMSC nodes and a mobile station, wherein an algorithm for generating an encryption key resides within the MSC node, comprising the steps of:

generating a random number by the PMSC;

transmitting the random number to the MSC using a PMAP protocol;

calculating the encryption key and a countersign at the MSC;

transmitting the encryption key and the countersign to the PMSC using the PMAP protocol;

comparing the countersign received from the MSC with a countersign provided by the mobile station to confirm a match; and encrypting transmissions between the PMSC and the mobile station using the encryption key.

* * * * *